(12) United States Patent
McAllister

(10) Patent No.: US 12,471,577 B2
(45) Date of Patent: Nov. 18, 2025

(54) AQUARIUM VIDEO ENTERTAINMENT SYSTEM

(71) Applicant: Patrick McAllister, Conifer, CO (US)

(72) Inventor: Patrick McAllister, Conifer, CO (US)

( * ) Notice: Subject to any disclaimer, the term of this patent is extended or adjusted under 35 U.S.C. 154(b) by 0 days.

(21) Appl. No.: 18/641,684

(22) Filed: Apr. 22, 2024

(65) Prior Publication Data

US 2024/0358004 A1 Oct. 31, 2024

Related U.S. Application Data

(60) Provisional application No. 63/462,343, filed on Apr. 27, 2023.

(51) Int. Cl.
  *G09G 5/00* (2006.01)
  *A01K 63/00* (2017.01)
  *G09F 9/30* (2006.01)

(52) U.S. Cl.
  CPC ............ *A01K 63/006* (2013.01); *G09F 9/301* (2013.01)

(58) Field of Classification Search
  CPC ................ G09F 9/301; G09G 2380/02; H10K 2102/311; A01K 63/00; A01K 63/006
  See application file for complete search history.

(56) References Cited

U.S. PATENT DOCUMENTS

| 10,917,679 | B2 * | 2/2021 | Dunning | ................ H04N 5/765 |
| 2012/0287241 | A1 * | 11/2012 | Foord | ................ H04N 21/4821 |
| | | | | 348/46 |

FOREIGN PATENT DOCUMENTS

| CN | 103208244 A | * | 7/2013 | ............ G06F 3/011 |
| CN | 104375778 A | * | 2/2015 | ............ G06F 3/011 |
| CN | 215182811 U | * | 12/2021 | ........... G06F 1/1601 |
| CN | 114003092 A | * | 2/2022 | ........... G06F 1/1601 |
| GB | 2522053 A | * | 7/2015 | ............ G02B 30/56 |
| JP | 2004221699 A | * | 8/2004 | |
| WO | WO-2017188478 A1 | * | 11/2017 | |
| WO | WO-2024011681 A1 | * | 1/2024 | ............ A01K 63/00 |

* cited by examiner

*Primary Examiner* — Joe H Cheng
(74) *Attorney, Agent, or Firm* — Thomas | Horstemeyer, LLP

(57) ABSTRACT

Various examples of aquarium or habitat enclosure integrated video systems are described. In one examples, an apparatus includes a display device integrated with a transparent surface of a habitat enclosure, a computing device comprising at least one processor; and a memory comprising computer-readable instructions. Computing device causes the display device to show video programming that is stored locally or accessed over a network.

20 Claims, 7 Drawing Sheets

AQUARIUM VIDEO ENTERTAINMENT SYSTEM

CROSS REFERENCE TO RELATED APPLICATIONS

This application claims priority to and the benefit of U.S. Provisional Application No. 63/462,343, Filed on Apr. 27, 2023 and entitled AQUARIUM VIDEO ENTERTAINMENT SYSTEM, which is hereby incorporated herein by reference in its entirety.

BACKGROUND

Aquariums are beautiful to look at and can provide aesthetic appeal and interest. Aquariums can be found in homes, businesses, schools, restaurants, zoological parks and entertainment facilities. Viewing an aquarium can reduces stress and lower blood pressure in some individuals. As a result, aquariums can be used to help people remain calm and relaxed in waiting rooms, medical facilities, and other locations.

Aquariums can use decorations that can include live or fake plants, real or fake rocks, thematic items such as divers, and other types of decorative elements. Having aquarium decorations can provide benefits for fish, reptiles, and other aquarium inhabitants, including higher interest and activity, decreased stress, decreased illness, and other benefits. A person viewing a well decorated aquarium can also enjoy the appearance of the decorations. However, aquarium decorations can be limited in scope and some moving decorations can pose a hazard to aquarium inhabitants. Aquarium cleaning and maintenance can be affected by an over-abundance of decorations in an aquarium.

BRIEF DESCRIPTION OF THE DRAWINGS

Aspects of the present disclosure will be more readily appreciated upon review of the detailed description of its various embodiments, described below, when taken in conjunction with the accompanying drawing depicted in the Figures.

Figure 1:
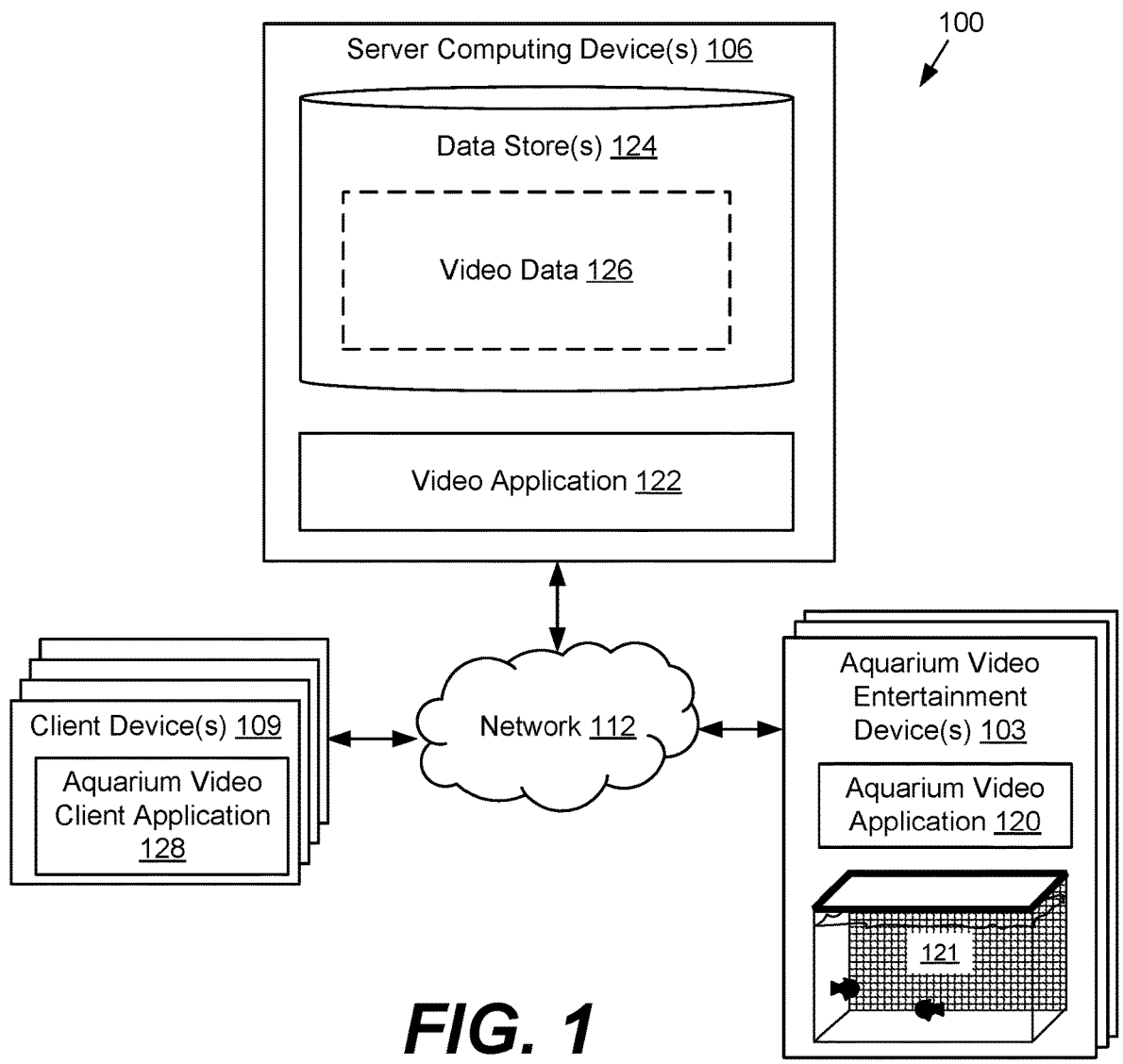
FIG. 1 shows an example of a networked environment that includes an aquarium video entertainment system, according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles.

DETAILED DESCRIPTION

The present disclosure involves aquarium video entertainment systems. Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

As described above, aquariums can provide aesthetic appeal in homes, businesses, schools, restaurants, zoological parks and entertainment facilities, reducing stress and lowering blood pressure. Aquariums decorations can include live or fake plants, real or fake rocks, thematic items such as divers, and other types of decorative elements. However, aquarium decorations can be limited in scope and some moving decorations can pose a hazard to aquarium inhabitants. Aquarium cleaning and maintenance can be affected by an over-abundance of decorations in an aquarium.

The present disclosure involves aquarium video entertainment systems and devices that can provide an unlimited variety of moving visualizations that can entertain human viewers and aquarium inhabitants alike, without affecting cleaning and maintenance, and without posing a hazard to aquarium inhabitants. An aquarium video entertainment system can include a display device integrated with at least one transparent surface of an aquarium, a computing device comprising at least one processor, and a memory comprising computer-readable instructions. The instructions can cause the system to display, on the display device, video programming that is stored locally or accessed over a network. In some examples, the video display can include an light-emitting diode (LED), organic LED (OLED), active-matrix OLED (AMOLED), other LED technology, other solid-state display device, or other display technology. In some examples, the display can include a transparent or translucent see-through display technology such as solid state or LED based flexible (or rigid) film, enabling the room surroundings to be seen through the display. In some examples, the display can include an opaque solid state or LED based flexible (or rigid) film. Both see-through and opaque displays can be used in a single aquarium video entertainment system or device. Since the displays can be flexible, the aquarium video entertainment systems and devices can include flat and curved displays of any shape. While the aquarium video entertainment systems can be inclusive of the habitat enclosure such as an aquarium, the aquarium video entertainment systems can also be provided as a kit that is designed to be affixed to a flat or curved surface of a habitat enclosure such as an aquarium.

The aquarium video entertainment system can provide a see-through video display on the front, back, or side of aquarium walls using a high-brightness OLED Transparent Film, LED, or any other visual technology. The unit can be any size with flat or curved surfaces. The system can be capable of storing, accessing, and playing a number of different videos or display images suited to a desired aesthetic. An extended video of special programming such as SEA-TV can be accessed locally or remotely using the system. The programming can feature beautiful videos of marine life designed to stimulate and entertain fish, forest scenes to make forest creatures at home, and other aesthetically pleasing and animal-specific videos. Example embodiments of the Aquarium video are shown and described in the figures. Generally, the device can include an aquarium that includes an integrated display device that stores and/or remotely accesses the selected video programming.

Moving now to the figures, FIG. 1 shows a networked environment 100, including an aquarium video entertainment system 103, a server computing device 106, and a client device 109, in electronic communication over a network 112. In some examples, the server computing device 106 can be considered a part of the aquarium video entertainment system 103, for example, if the server computing device is operated by a provider of the aquarium video entertainment system 103 such as a seller or manufacturer of the system. However, the aquarium video entertainment system 103 can interact with any server computing device 106 that provides video and/or image services.

The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks. Examples of networks can include the Internet, intranets, extranets, virtual private networks (VPNs), and similar networks.

The aquarium video entertainment system 103 can include a display that plays video from an aquarium video application 120 through at least one glass or transparent surface of a habitat enclosure 121 such as an aquarium, terrarium, vivarium, terrarium, insectarium, and so on. Generally, these habitat enclosure 121 have been colloquially referred to as aquariums regardless of the inhabitants and contents of the habitat enclosure 121, so references to an "aquarium" can refer to any type of habitat enclosure 121 unless context indicates otherwise, and an "aquarium" video entertainment system 103 can refer to a "habitat enclosure" video entertainment system integrated or designed to be integrated with any habitat enclosure 121 unless context indicates otherwise. An enclosure can include open and closed enclosures, such as aquariums that include an open top, an openable top, a solid enclosed top, and so on.

The aquarium video entertainment system 103 can include a display device integrated with at least one transparent surface of the habitat enclosure 121. The aquarium video entertainment system 103 can also include a computing device with at least one processor, and a memory that includes or accesses computer-readable instructions such as an aquarium video application 120 that can be executed using the processor. The computing device can also include firmware, an operating system, and other applications and services that operate the components of the aquarium video application 120 including the display, lighting effects from lights in the system that are separate from the display, sound effects from speakers of the system, and so on. Lighting effects can include a lighting color selection and from discrete LED-type lights or diffused LED lights such as neon-effect rope lights and other lights that can be integrated with the overall device/system. This can also include selection, through user interfaces of the aquarium video entertainment system 103 and/or the client device 106, of color fade effects, audio and music synced color and intensity effects, and so on. In some examples, the display can additionally or alternatively be set to provide color fade effects, audio and music synced color and intensity effects, and the other effects discussed.

The aquarium video application 120 can cause the system to display, on the display device, video programming, images, and other content that is stored locally or accessed over the network 112 from a server computing device 106 or a client device 109. In some examples, the display can include an LED, OLED, AMOLED, other LED technology, other solid-state display device, or other display technology. In some examples, the display can include a transparent or translucent see-through display technology such as solid state or LED based flexible (or rigid) film. In some examples, the display can include an opaque solid state or LED based flexible (or rigid) film. Both see-through and opaque displays can be used in a single aquarium video entertainment system or device. Since the displays can be flexible, the aquarium video entertainment systems and devices can include flat and curved displays of any shape.

The aquarium video entertainment system 103 can provide a see-through video display on the front, back, and/or side of aquarium walls. The unit can be any size with flat and/or curved surfaces, as facilitated by a film-based display device. The system can be capable of storing, accessing, and playing a number of different videos or display images suited to a desired aesthetic. For example, the content can include still images, audio, and video of a variety of different types and subtypes appropriate for different types of habitat enclosures 121 or animals within the habitat enclosures 121. In some examples, the aquarium video entertainment system 103 can store, in a local data store of the system, a set of videos corresponding to common types of habitat enclosures 121 and animals within the habitat enclosures 121. The videos can include looped videos that match at the beginning and end of the video, as well as typical videos that show any other type of programming.

In some examples, the aquarium video entertainment system 103 can include one or more physical button that causes the aquarium video application 120 to select or cycle through individual ones of the set of videos stored in the aquarium video application 120, and/or between categories or types of videos displayed by the aquarium video entertainment system 103. The aquarium video entertainment system 103 can also provide a wireless connection ability to connect to the server computing device 106 and the client device 109 to access video content.

The server computing device 106, while referred to in the singular, can include one or more computing devices that include a processor, a memory, and/or a network interface. For example, a server computing device 106 can be configured to perform computations on behalf of other computing devices or applications. As another example, such computing devices can host and/or provide content to other computing devices in response to requests for content. Moreover, the server computing device 106 can refer to a plurality of computing devices that can be arranged in one or more server banks or computer banks or other arrangements. Such computing devices can be located in a single installation or can be distributed among many different geographical locations. For example, the server computing device 106 can include a plurality of computing devices that together can include a hosted computing resource, a grid computing resource or any other distributed computing arrangement. In some cases, the server computing device 106 can correspond to an elastic computing resource where the allotted capacity of processing, network, storage, or other computing-related resources can vary over time.

The video application 122 can include first party and third party video services, including streaming services, download services, and other services. The video application 122 can provide the aquarium video entertainment system 103 with access to video data 126 in the data store 124. The video application 122 can, in some examples, be preconfigured to include instructions that enable the aquarium video entertainment system 103 and the aquarium video application 120 to automatically authenticate and access a predetermined and curated set of videos for streaming and/or download access. The aquarium video application 120 can also include instructions to automatically authenticate and access a predetermined and curated set of videos for streaming and/or download access. For example, the aquarium video application 120 can include a network address to which the aquarium video application 120 can automatically authenticate and connect to once a network connection is established. The aquarium video entertainment system 103 can authenticate with the server computing device 106 using password based authentication, certificate based authentication, symmetric key cryptography, and other types of cryptographic authentication.

The aquarium video application 120 can automatically transmit a request to connect to the video application 122 that includes a predetermined password, provides a certificate, initiates a certificate exchange, or otherwise automatically authenticates in conjunction with the video application 122 of the server computing device 106. However, in other examples, the aquarium video client application 128 can provide user interface elements that can cause the aquarium video application 120 of the aquarium video entertainment system 103 to authenticate the with the video application 122 of the server computing device 106 and begin providing video data 126 for display on the aquarium video entertainment system 103. The aquarium video application 120 can also include a listing of one or more predetermined playlists and/or specific videos that are pre-associated with particular animals, scenes, and other categories shown in a user interface of the aquarium video application 120. A user can select a user interface indicating a particular category, and the aquarium video application 120 can identify a predetermined search query, Uniform Resource Link, or other network address of the video application 122 and/or the server computing environment, and transmit a request to download or stream the video content. However, the aquarium video application 120 can also include one or more playlists and/or specific videos of content stored locally. A user can select a user interface element (e.g., using the user interface of the aquarium video application 120 and/or the aquarium video client application 128) indicating a particular category, and the aquarium video application 120 can search a local hard drive or data store for corresponding videos and playlists, and display the content. This can include pre-loaded and/or user-downloaded content. To this end the user interface(s) of the aquarium video application 120 and/or the aquarium video client application 128 can enable a user to categorize downloaded videos into predetermined and/or custom categories, and the user interface(s) of the user interface(s) of the aquarium video application 120 and/or the aquarium video client application 128 can be generated to include the predetermined and/or custom categories.

In some cases, the aquarium video entertainment system 103 can include an integrated control device(s) such as a touchpad and/or physical buttons such as one or more directional buttons, a selection button, and a back or cancel button, and the aquarium video application 120 can provide a user experience and user interface elements to select video content by displaying a user interface on the display device of the aquarium video entertainment system 103. In some examples, the integrated control device(s) of the aquarium video entertainment system 103 can be water resistant or waterproof to a predetermined rating.

The client device 109 can be representative of a plurality of client devices 109 that can be coupled to the network 112. The client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, medical equipment or other devices with like capability. The client device 109 can include one or more displays such as liquid crystal displays (LCDs), gas plasma-based flat panel displays, organic light emitting diode (OLED) displays, electrophoretic ink ("E-ink") displays, projectors, or other types of display devices. In some instances, the displays 184 can be a component of the client device 109 or can be connected to the client device 109 through a wired or wireless connection.

The client device 109 can be configured to execute various applications such as a client application or other applications. The client application can be executed in a client device 109 to access network content served up by the computing device(s) 103 or servers, thereby rendering a user interface on a display of the device. To this end, the client application can include a browser, a dedicated application, or other executable, and the user interface can include a network page, an application screen, or other user mechanism for obtaining user input. The client device 109 can be configured to execute client applications such as browser applications, chat applications, messaging applications, email applications, social networking applications, word processors, spreadsheets, the aquarium video client application 128, or other applications.

The aquarium video client application 128 can generate user interface elements through which a user can select, set, schedule, update, and otherwise control video and images displayed using the aquarium video application 120. The client device 109 can connect to the aquarium video entertainment system 103 through wired and wireless networks as a peripheral or otherwise enabling the aquarium video client application 128 to select and control the video and images displayed using the aquarium video application 120. This can include a user interface that can provide user interface elements through which a user can configure the aquarium video application 120 and the aquarium video entertainment system 103 to connect to a particular local area network, for example, in a home or enterprise environment.

A user of a client device 109 can have a paid or free membership or account that enables access to video data 126 provided by the video application 122. The aquarium video client application 128 can generate user interface elements through which a user can configure the aquarium video application 120 to access the video data 126 provided by the video application 122 of the server computing device 106.

Figure 2:
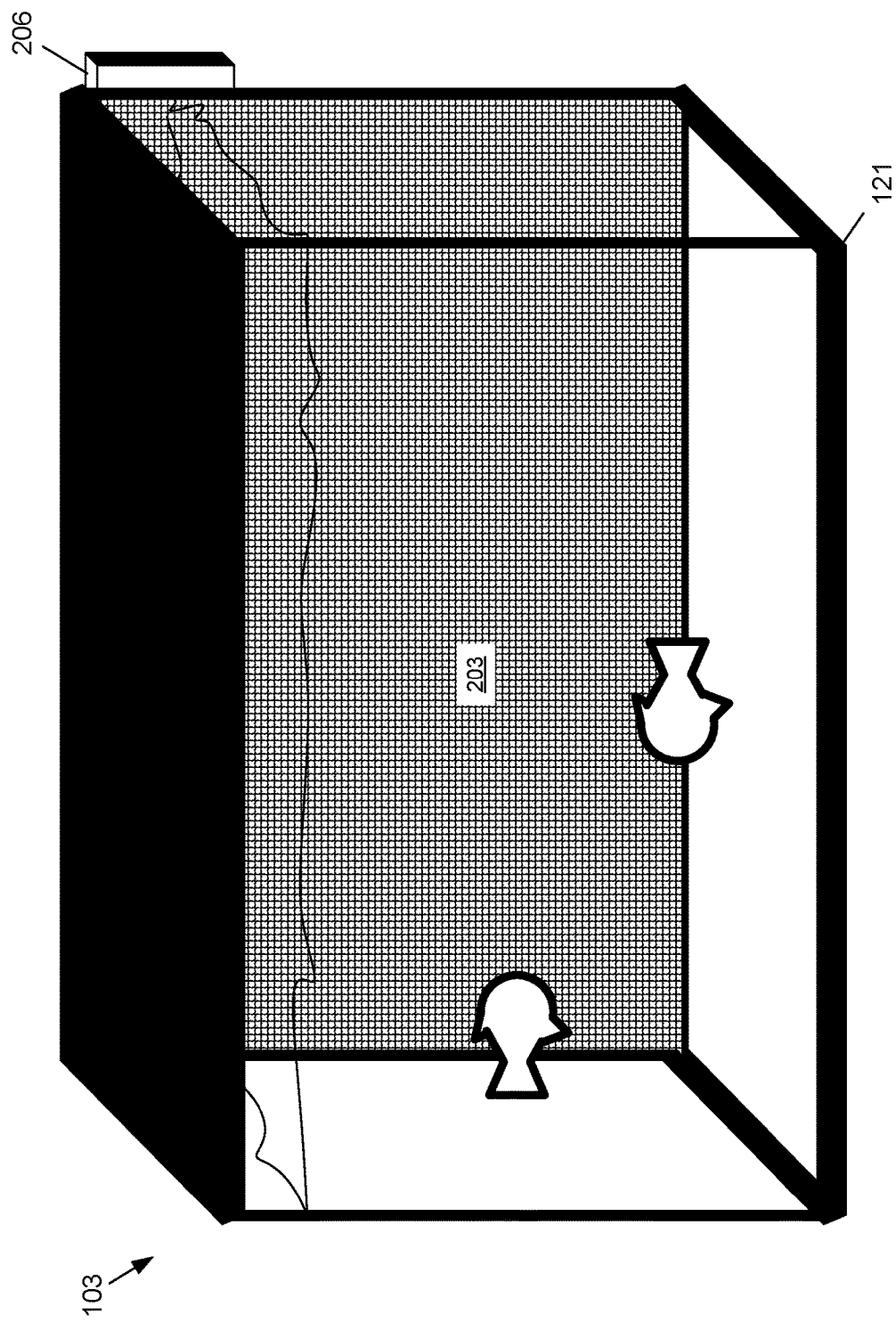
FIG. 2 shows an example of an aquarium video entertainment system, according to various embodiments of the present disclosure.

Moving to FIG. 2, shown is one example of an aquarium video entertainment system 103. In this example, the aquarium video entertainment system 103 can include a habitat enclosure 121 such as an aquarium, a display device 203, and a computing device assembly 206. In some examples, an integrated control device can be included on a surface of the computing device assembly, a top of the enclosure, as a handheld wired peripheral device, or another type of control. A separate wireless handheld controller can also be used in a manner similar to the integrated control device for video content selection, lighting effect selection, sound volume and effect selections, and user interface navigation. In this example, the aquarium can hold water and can include fish. While aquatic video can be displayed, any video content can be selected for person or habitat denizen entertainment.

The display device 203 that can be integrated with a rear flat surface of the habitat enclosure 121 of the aquarium video entertainment system 103. The display device 203 can include an LED, OLED, AMOLED, other LED display device, other solid-state display device, or use other display technology. In this example, the display device 203 can include a transparent or translucent see-through display technology such as solid state or other LED based flexible (or rigid) film, which can be affixed to the surface of the habitat enclosure 121 using a waterproof or water resistant transparent adhesive, such as acrylic, epoxy, cyanoacrylate, polyurethane, silicone, modified silane polymers, ultraviolet curable adhesives, or other waterproof transparent adhesives. In some examples, water resistant adhesives can refer to an adhesive that resists water intrusion for a predetermined time, such as fifteen minutes, thirty minutes, or up to an hour. Waterproof adhesives can refer to an adhesive that resists water intrusion for a predetermined time such as over an hour, up to a predetermined number of hours, or another predetermined time that is more than the water resistant adhesive. The adhesives can also be hydrophobic, meaning that water is not only resistant to intrusion, but also repels water and other liquids. Using these types of adhesives can prevent water, saltwater, and other liquid intrusion that can otherwise cause the display device 203 to become clouded or fogged over time. This can also prevent water from damaging electrical components of the display device 203. The rear surface of the display device 203 can include a waterproof cover or coating, which can prevent water splash from affecting the electronic components of the display device 203, since many habitat enclosures 121 include liquids, whether the habitat enclosure 121 is an aquarium, terrarium, or other type of enclosure as discussed.

The computing device assembly 206 of the aquarium video entertainment system 103 can include an electronics enclosure that contains a computing device such as a computer, controller, and other electronics that can execute the aquarium video application 120. The computing device assembly 206 of the aquarium video entertainment system 103 can be designed to prevent water intrusion into electronic components including power handling components and computing devices of the computing device assembly 206. For example, the computing device assembly 206 can have an Ingress Protection (IP) IP_1, IP_2, IP_3, IP_4, IP_5, IP_5, IP_6, IP_7, IP_8, or another rating, where the underscore "_" is a placeholder for a level of protection against dust and other solids. The computing device assembly 206 can include one or more speakers, such as waterproof speakers rated to the same (or a different) specific water ingress protection rating as the (enclosure of) the computing device assembly 206 generally.

In some examples the computing device assembly 206 of the aquarium video entertainment system 103 can be fully enclosed from water intrusion. In other examples, the computing device assembly 206 of the aquarium video entertainment system 103 can include ventilation only at a bottom surface, designs such that water splash cannot drain onto and damage electronic components. In some cases, the computing device assembly 206 can include a ground fault circuit interrupter (GFCI) device that can prevent shocks to persons and damage to the aquarium video entertainment system 103.

While shown as a box connected to the display device 203, in some examples, the computing device assembly 206 can be located on a bottom of the aquarium video entertainment system 103, along an edge or otherwise on a side of the habitat enclosure 121, on a top cover of the habitat enclosure 121, integrated into the electronics of the film of the display device 203, or otherwise included. However, locating the computing device assembly 206 on a back, bottom, or side of the aquarium video entertainment system 103 can enable the habitat enclosure 121 to be opened or closed from the top in the typical manner, without special care being taken.

Figure 3:
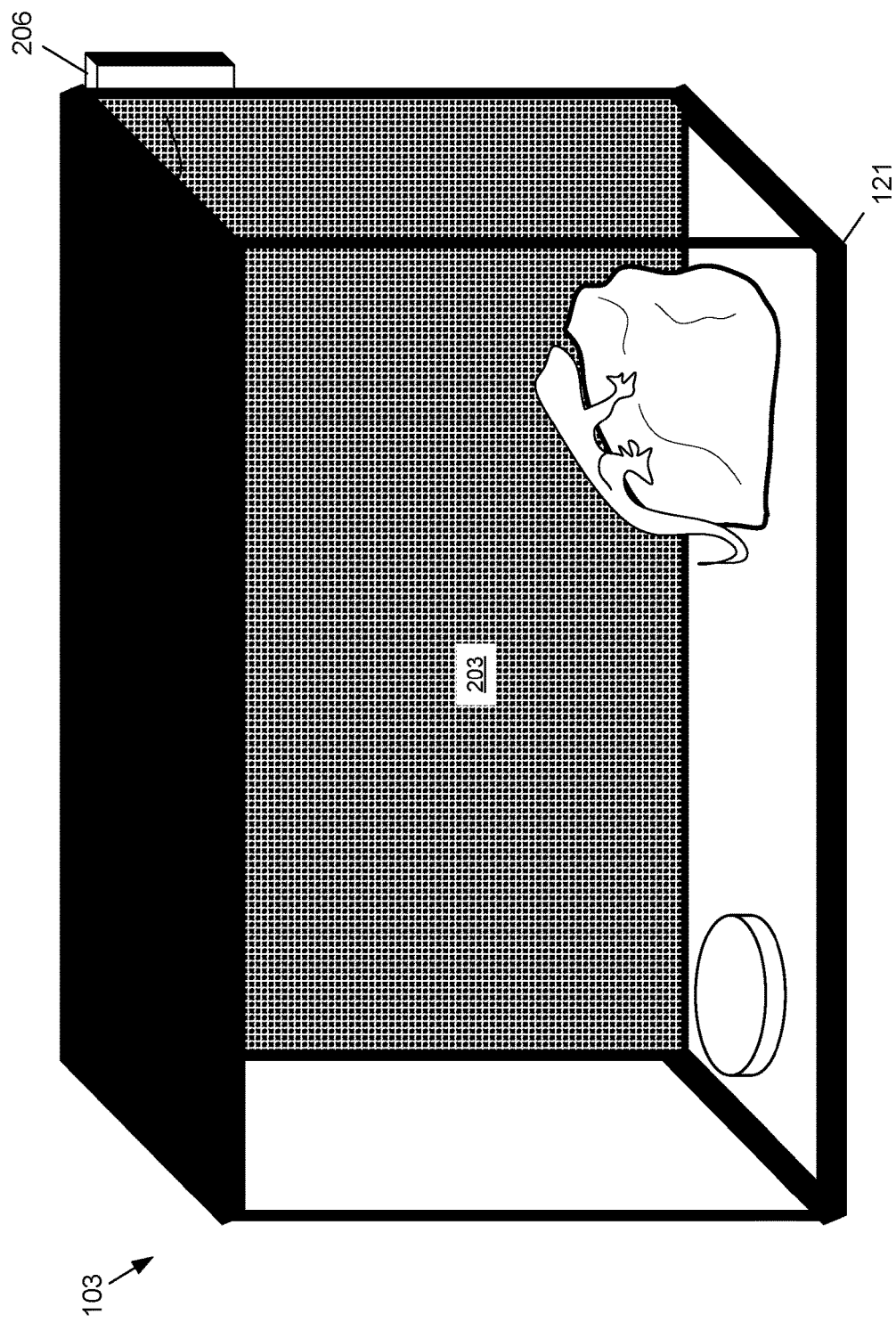
FIG. 3 shows another example of an aquarium video entertainment system, according to various embodiments of the present disclosure.

FIG. 3 shows another example of an aquarium video entertainment system 103. In this example, the aquarium video entertainment system 103 can include a habitat enclosure 121 such as a terrarium or vivarium that includes a reptile, gecko, or other non aquatic or semiaquatic inhabitant, a display device 203, and a computing device assembly 206. While video can be displayed that matches the natural environment of the inhabitant of the habitat enclosure 121, any video content can be selected for entertainment of persons and/or inhabitants.

While otherwise similar to the aquarium video entertainment system 103 above, in this example, the video entertainment system 103 can include the display device 203 and can include an opaque display technology such as solid state or other LED based flexible (or rigid) film, which can be affixed to the surface of the habitat enclosure 121 using a waterproof or water resistant transparent adhesive, such as acrylic, epoxy, cyanoacrylate, polyurethane, silicone, modified silane polymers, ultraviolet curable adhesives, or other waterproof transparent adhesives. Although the habitat enclosure 121 may not enclose or hold water, it may include aa water dish or another object or holder of liquids. The selection of opaque display film or technologies vs transparent or translucent films or other technologies can be an aesthetic choice, rather than one guided by the type of enclosure. However, the IP rating of the computing device assembly 206 can be selected to be lower in some examples where the habitat enclosure 121 does not hold water.

Figure 4:
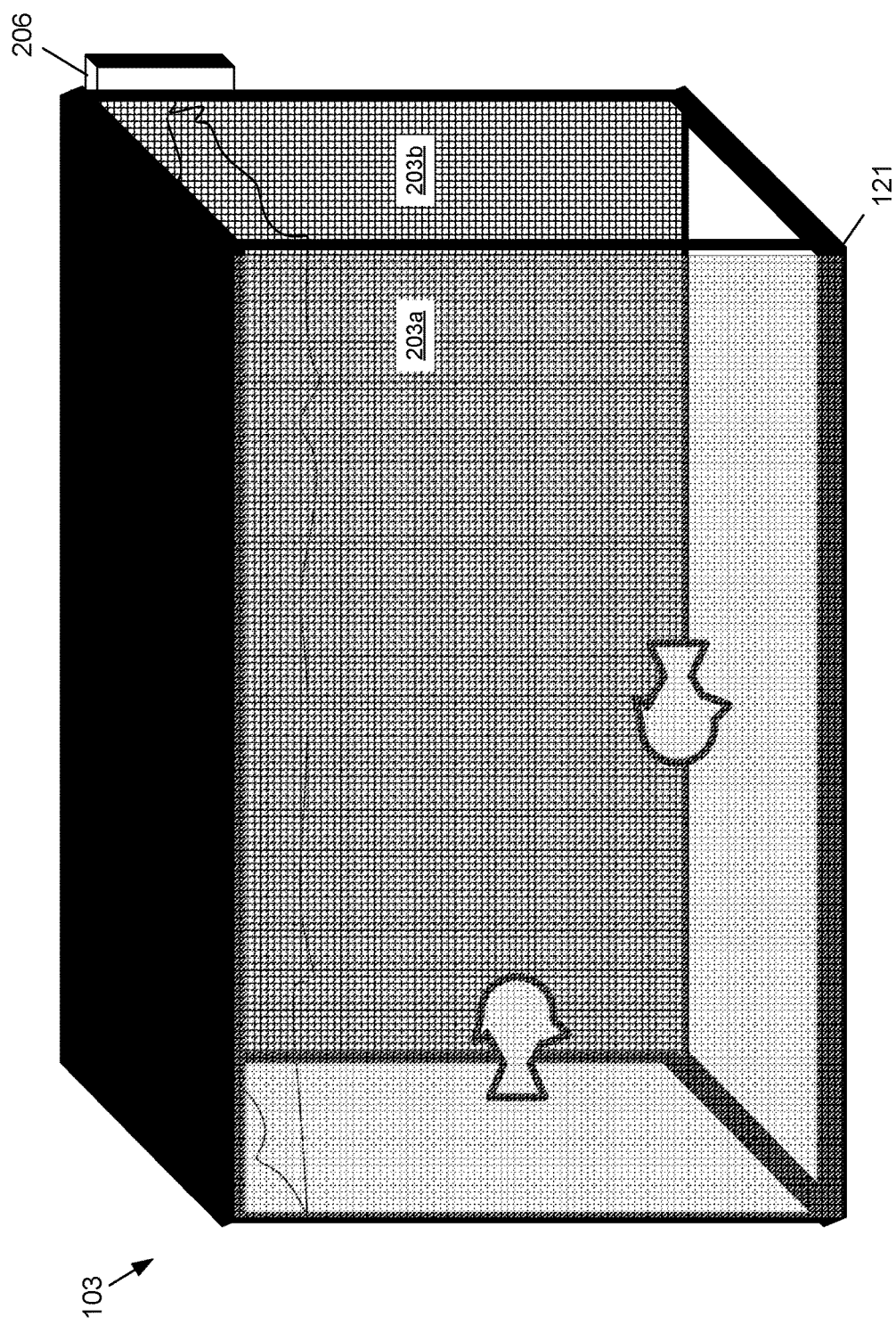
FIG. 4 shows another example of an aquarium video entertainment system, according to various embodiments of the present disclosure.

FIG. 4 shows another example of an aquarium video entertainment system 103. While otherwise similar to the aquarium video entertainment system 103 of FIG. 2, in this example, the video entertainment system 103 can include multiple transparent or translucent display devices 203a and 203b (the display devices 203). In some examples, the transparent or translucent display devices 203 can include two different items of video content that are matched such that they are not identical, but show the same category or type of video content, such as ocean, lake, or other aquatic content such that the two screens on opposite sides or otherwise multiple sides of the aquarium video entertainment system 103 can provide an immersive experience for viewers and aquarium inhabitants. In some examples, the two different items of video content can include video that is time-shifted such that two different time periods of a single video are displayed using the two different display devices 203. This can decrease the amount of data streamed, stored, or otherwise utilized for the display.

Figure 5:
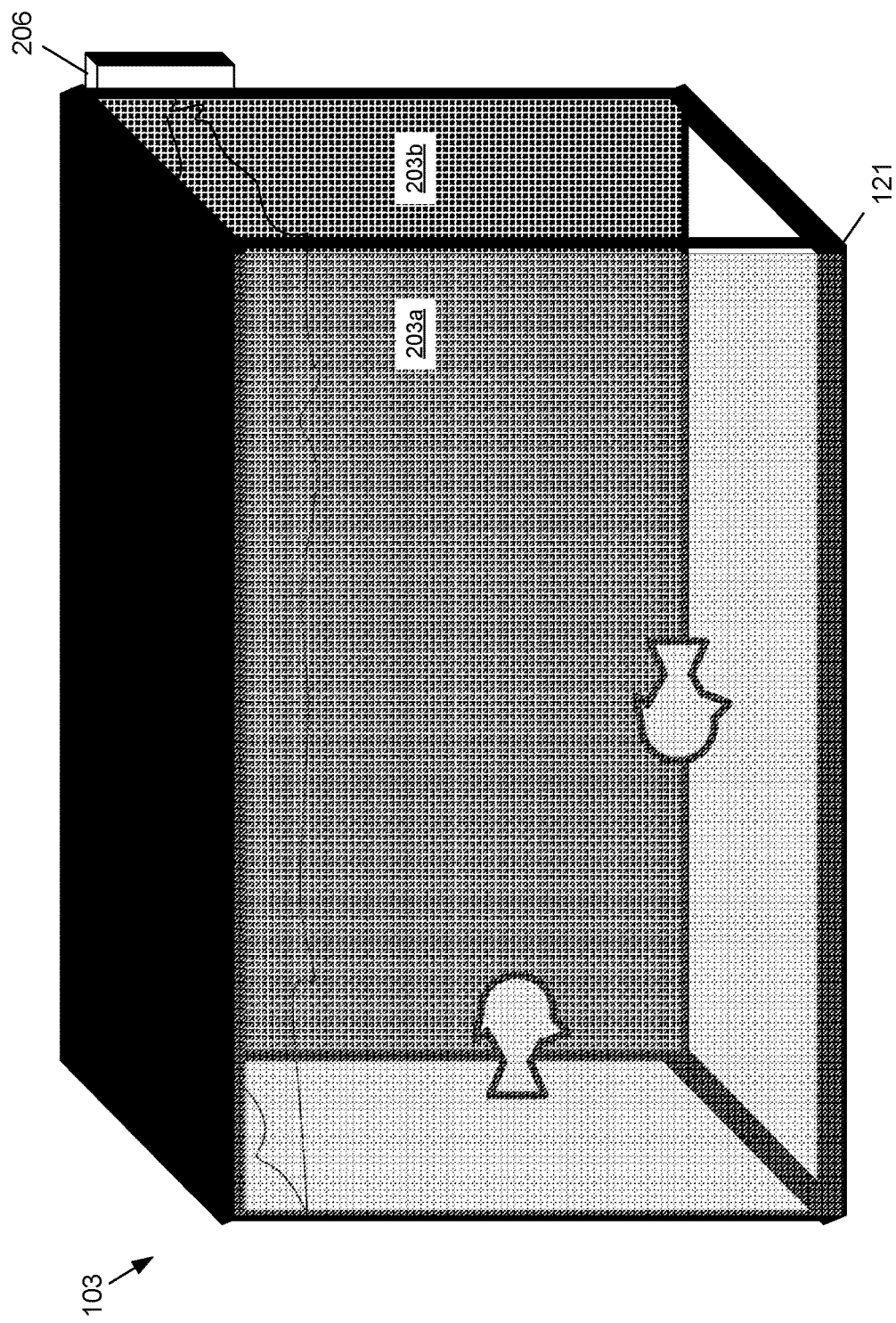
FIG. 5 shows another example of an aquarium video entertainment system, according to various embodiments of the present disclosure.

FIG. 5 shows another example of an aquarium video entertainment system 103. While otherwise similar to the aquarium video entertainment system 103 of FIG. 3, in this example, the video entertainment system 103 can include one see through display device 203a, and one opaque display device 203b (together, the display devices 203). In some examples, the display devices 203 can include two different items of video content that are matched such that they are not identical, but show the same category or type of video content, such as ocean, lake, or other aquatic content such that the two screens on opposite sides or otherwise multiple sides of the aquarium video entertainment system 103 can provide an immersive experience for viewers and aquarium inhabitants. In some examples, the two different items of video content can include video that is time-shifted such that two different time periods of a single video are displayed using the two different display devices 203. This can decrease the amount of data streamed, stored, or otherwise utilized for the display.

Figure 6:
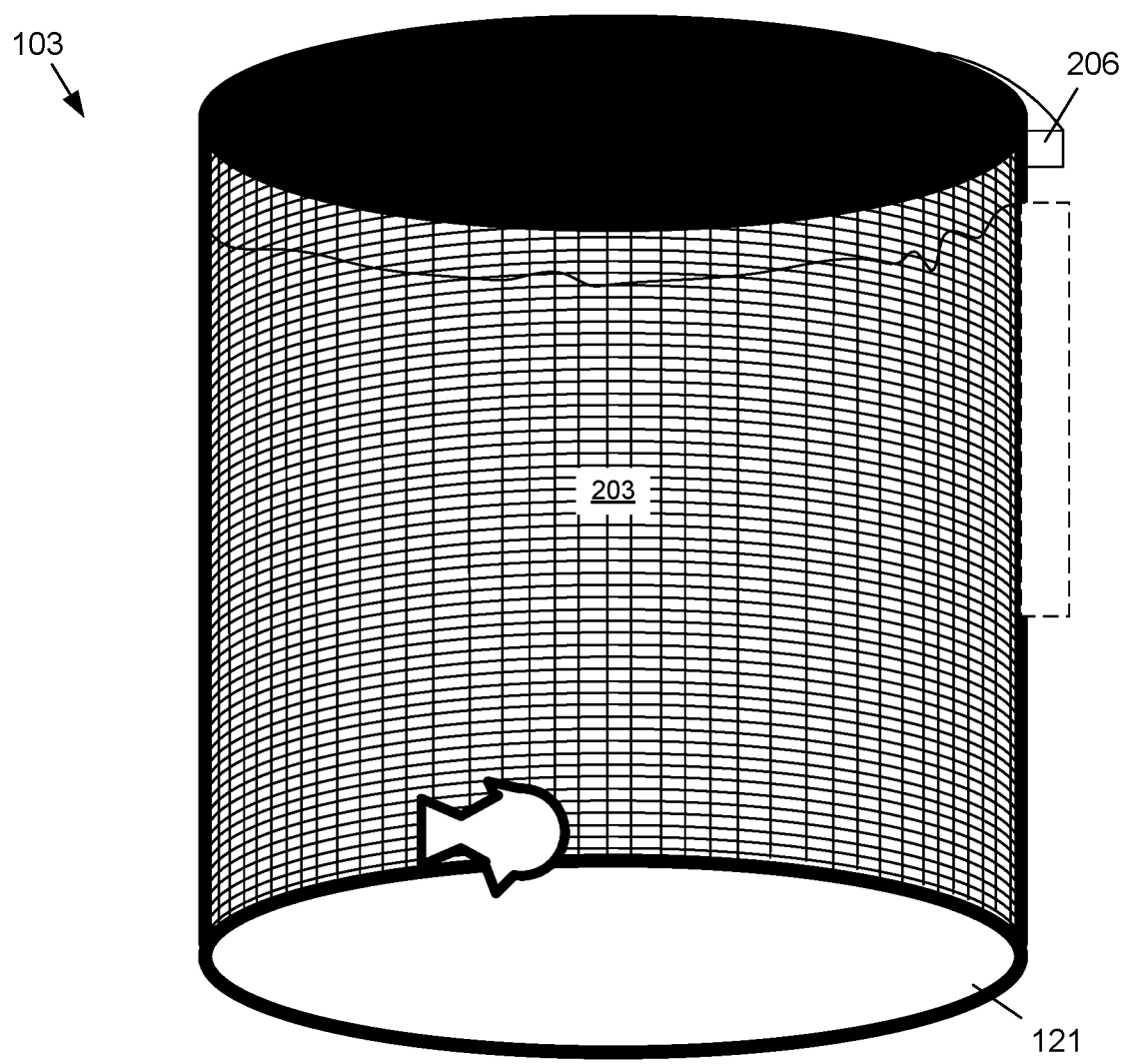
FIG. 6 shows another example of an aquarium video entertainment system, according to various embodiments of the present disclosure.

FIG. 6 shows another example of an aquarium video entertainment system 103. In this example, the aquarium video entertainment system 103 can still include one or more display devices 203 as described for any of the FIGS. 2-5, and a computing device enclosure 206. However, the display device 203 or devices can be a film or other display technology that is curved to match the surface of the habitat enclosure 121 of the aquarium video entertainment system 103. The computing device enclosure 206 can also be curved to match the surface of the habitat enclosure 121. However, in other examples, a vertically mounted computing device enclosure (dotted lines) can be used such that the flat edge of the computing device enclosure 206 can be mounted perpendicular to a curvature of the curved surface of the habitat enclosure 121. In further examples, the computing device enclosure 206 can be on a top of bottom of the aquarium video entertainment system 103 when the display surfaces or other surfaces are curved.

Figure 7A:
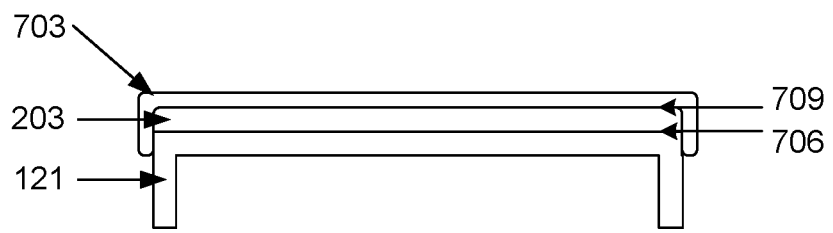
FIGS. 7A and 7B show an examples of a video film assemblies for aquarium video entertainment systems according to various embodiments of the present disclosure.
Figure 7B:
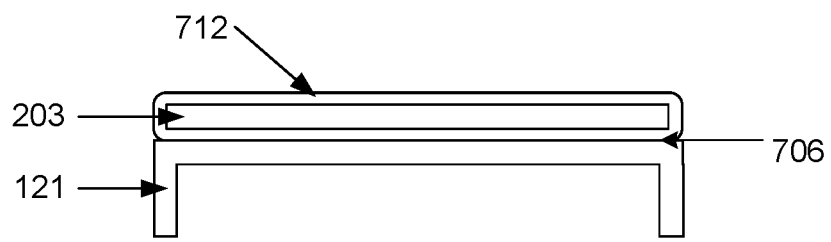

FIGS. 7A and 7B show examples of how to integrate the display devices 203 of an aquarium video entertainment system 103 to the surface of the habitat enclosure 121. While flat surfaces are shown, the principles can be extended to curved surfaces as well. FIG. 7A shows a surface of the habitat enclosure 121 can be affixed to the film or other display device 203 using see through and water resistant or waterproof adhesive 706. A rear protection covering 703 or backing such as a waterproof, water resistant, and/or hydrophobic film or shell can be affixed to the film or other display device 203 using waterproof, water resistant, and/or hydrophobic and see through (or alternatively opaque) adhesive 709. In cases where the rear protection covering 703 is see through (that is, transparent or translucent), the adhesive 709 can be see through. However, if the rear protection covering 703 is opaque, the adhesive 709 can be opaque or see through in various embodiments. FIG. 7B shows that the film or other display device 203 can be encased in a protective envelopment component 712 such as waterproof, water resistant, and/or hydrophobic film or casing. In various examples, the protective envelopment component 712 can be flexible or rigid. In this example, the see through adhesive 706 can be used to connect the assembly of the protective envelopment component 712 and the display device 203 (encased in the protective envelopment component 712) to the surface of the habitat enclosure 121.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. While features can be shown and described with respect to a particular figure, the features in one figure are applicable to the other figures of the disclosure. Any recited method can be carried out in the order of events recited or in any other order that is logically possible.

What is claimed:

1. A system comprising:
   at least one display device integrated with at least one surface of an aquarium, wherein the at least one display device comprises a rear protection covering or a protective envelopment component that envelops the at least one display device, wherein the rear protection covering or the protective envelopment component is at least one of: water resistant, waterproof, hydrophobic, or any combination thereof; and
   a computing device comprising at least one processor; and a memory comprising computer-readable instructions, wherein the instructions, when executed by the computing device, cause the computing device to:
      display, on the at least one display device, video programming that is stored locally or accessed over a network.

2. The system of claim 1, wherein the at least one display device comprises a flexible light emitting diode display.

3. The system of claim 1, wherein the at least one display device comprises a flexible light emitting diode display that is transparent or translucent.

4. The system of claim 1, wherein the at least one display device is affixed to at least one surface of the aquarium using an adhesive that is transparent.

5. The system of claim 4, wherein the adhesive is at least one of: water resistant, waterproof, hydrophobic, or any combination thereof.

6. A system comprising:
   at least one display device integrated with at least one surface of an aquarium, wherein the at least one display device comprises a flexible light emitting diode display that is opaque; and
   a computing device comprising at least one processor; and a memory comprising computer-readable instructions, wherein the instructions, when executed by the computing device, cause the computing device to:
      display, on the at least one display device, video programming that is stored locally or accessed over a network.

7. The system of claim 6, wherein the at least one display device is affixed to at least one surface of the aquarium using an adhesive that is transparent.

8. An apparatus comprising:
   at least one display device integrated with at least one transparent surface of a habitat enclosure, wherein the at least one display device comprises a rear protection covering or a protective envelopment component that envelops the at least one display device, wherein the rear protection covering or the protective envelopment component is at least one of: water resistant, waterproof, hydrophobic, or any combination thereof; and
   a computing device comprising at least one processor; and a memory comprising computer-readable instructions, wherein the instructions, when executed by the computing device, cause the computing device to:
display, on the at least one display device, video programming that is stored locally or accessed over a network.

9. The apparatus of claim 8, wherein the at least one display device comprises a flexible light emitting diode display.

10. The apparatus of claim 8, wherein the at least one display device is affixed to the at least one display device at least one surface of the habitat enclosure using a transparent adhesive that is at least one of: water resistant, waterproof, hydrophobic, or any combination thereof.

11. The apparatus of claim 8, wherein the at least one display device comprises a plurality of display devices that display the video programming.

12. The apparatus of claim 8, wherein the instructions, when executed by the computing device, cause the computing device to: identify video content of the video programming based at least in part on a selected topic from a predetermined set of selected topics.

13. The apparatus of claim 8, wherein the at least one display device is affixed to at least one surface of the habitat enclosure using an adhesive that is transparent.

14. An apparatus comprising:
at least one display device integrated with at least one transparent surface of a habitat enclosure;
a computing device comprising at least one processor; and
a memory comprising computer-readable instructions, wherein the instructions, when executed by the computing device, cause the computing device to:
display, on the at least one display device, video programming that is stored locally or accessed over a network; and
a computing device enclosure that is waterproof or water resistant.

15. A method comprising:
integrating at least one display device with at least one transparent surface of a habitat enclosure;
providing a computing device integrated with the habitat enclosure and the at least one display device;
enveloping the at least one display device in a protective envelopment component that is at least one of: water resistant, waterproof, hydrophobic, or any combination thereof; and
displaying video programming on the at least one display device, based at least in part on instructions executed using the computing device, wherein the video programming is stored locally to the computing device or accessed over a network.

16. The method of claim 15, wherein the at least one display device comprises a flexible light emitting diode display.

17. The method of claim 15, wherein the at least one display device comprises a plurality of display devices that display the video programming.

18. The method of claim 15, further comprising identifying video content of the video programming based at least in part on a selected topic from a predetermined set of selected topics.

19. The method of claim 15, wherein the at least one display device comprises a flexible light emitting diode display that is opaque.

20. A method comprising:
integrating at least one display device with at least one transparent surface of a habitat enclosure;
providing a computing device integrated with the habitat enclosure and the at least one display device, wherein the at least one display device is affixed to at least one surface of the habitat enclosure using a transparent adhesive that is at least one of: water resistant, waterproof, hydrophobic, or any combination thereof; and
displaying video programming on the at least one display device, based at least in part on instructions executed using the computing device, wherein the video programming is stored locally to the computing device or accessed over a network.

\* \* \* \* \*